(12) United States Patent
Ohkubo

(10) Patent No.: US 11,588,817 B2
(45) Date of Patent: Feb. 21, 2023

(54) USER AUTHENTICATION MANAGEMENT DEVICE, IMAGE PROCESSING APPARATUS INCLUDING THE SAME, USER AUTHENTICATION MANAGEMENT METHOD, AND STORAGE MEDIUM

(71) Applicant: SHARP KABUSHIKI KAISHA, Sakai (JP)

(72) Inventor: Hirotoshi Ohkubo, Sakai (JP)

(73) Assignee: SHARP KABUSHIKI KAISHA, Osaka (JP)

(*) Notice: Subject to any disclaimer, the term of this patent is extended or adjusted under 35 U.S.C. 154(b) by 32 days.

(21) Appl. No.: 16/936,216

(22) Filed: Jul. 22, 2020

(65) Prior Publication Data
US 2021/0029118 A1 Jan. 28, 2021

(30) Foreign Application Priority Data
Jul. 26, 2019 (JP) .............................. JP2019-137867

(51) Int. Cl.
*H04L 9/40* (2022.01)

(52) U.S. Cl.
CPC ........ *H04L 63/0884* (2013.01); *H04L 63/083* (2013.01)

(58) Field of Classification Search
CPC .......................... H04L 63/0884; H04L 63/083
USPC ............................................................ 726/6
See application file for complete search history.

(56) References Cited

U.S. PATENT DOCUMENTS

| 7,380,121 B2* | 5/2008 | Nomura | G06F 21/608 |
| | | | 713/166 |
| 9,118,656 B2* | 8/2015 | Ting | H04L 63/0815 |
| 11,012,444 B2* | 5/2021 | Bansal | H04L 63/0815 |

(Continued)

FOREIGN PATENT DOCUMENTS

| JP | 2005-109748 A | 4/2005 |
| JP | 2010-068294 A | 3/2010 |

(Continued)

OTHER PUBLICATIONS

Cui et al., 2017 IEEE International Conference on Computational Science and Engineering (CSE) and (EUC) "A More Secure and Practical Remote User Authentication Scheme for Multi-server Environment", pp. 537-540 (Year: 2017).*

(Continued)

*Primary Examiner* — Khalil Naghdali
(74) *Attorney, Agent, or Firm* — ScienBiziP, P.C.

(57) ABSTRACT

Provided is a user authentication management device including a login request receiver that receives a login request from a user from a plurality of inputters via a path corresponding to each of the plurality of inputters, an authentication scheme selector that selects any one of a plurality of authentication schemes and provides identification information of a user related to the received login request to the selected authentication scheme to perform user authentication, and a user information storage that stores a user authentication result received from the selected authentication scheme as user information related to the user, in which the authentication scheme selector selects an authentication scheme predetermined corresponding to a path through which the login request is received.

8 Claims, 7 Drawing Sheets

(56) References Cited

U.S. PATENT DOCUMENTS

| | | | |
|---|---|---|---|
| 2010/0332823 A1* | 12/2010 | Tsujimoto | H04N 1/4426 |
| | | | 713/155 |
| 2012/0302210 A1 | 11/2012 | Miyazaki | |
| 2014/0189796 A1* | 7/2014 | Mashimo | G06F 21/604 |
| | | | 726/3 |
| 2015/0150117 A1 | 5/2015 | Uruma | |

FOREIGN PATENT DOCUMENTS

| | | |
|---|---|---|
| JP | 2012-212368 A | 11/2012 |
| JP | 2012-247927 A | 12/2012 |
| JP | 2015-104022 A | 6/2015 |

OTHER PUBLICATIONS

Haron et al., 2016 IEEE 14th Annual Conference on Privacy, Security and Trust (PST) "User Behaviour and Interactions for Multimodal Authentication", pp. 309-316 (Year: 2016).*

Chang et al., IEEE 2012 Seventh Asia Joint Conference on Information Security, "Mobile Friendly and Highly Efficient Remote User Authenticated Key Agreement Protocol Featuring Untraceability", pp. 38-43 (Year: 2012).*

* cited by examiner

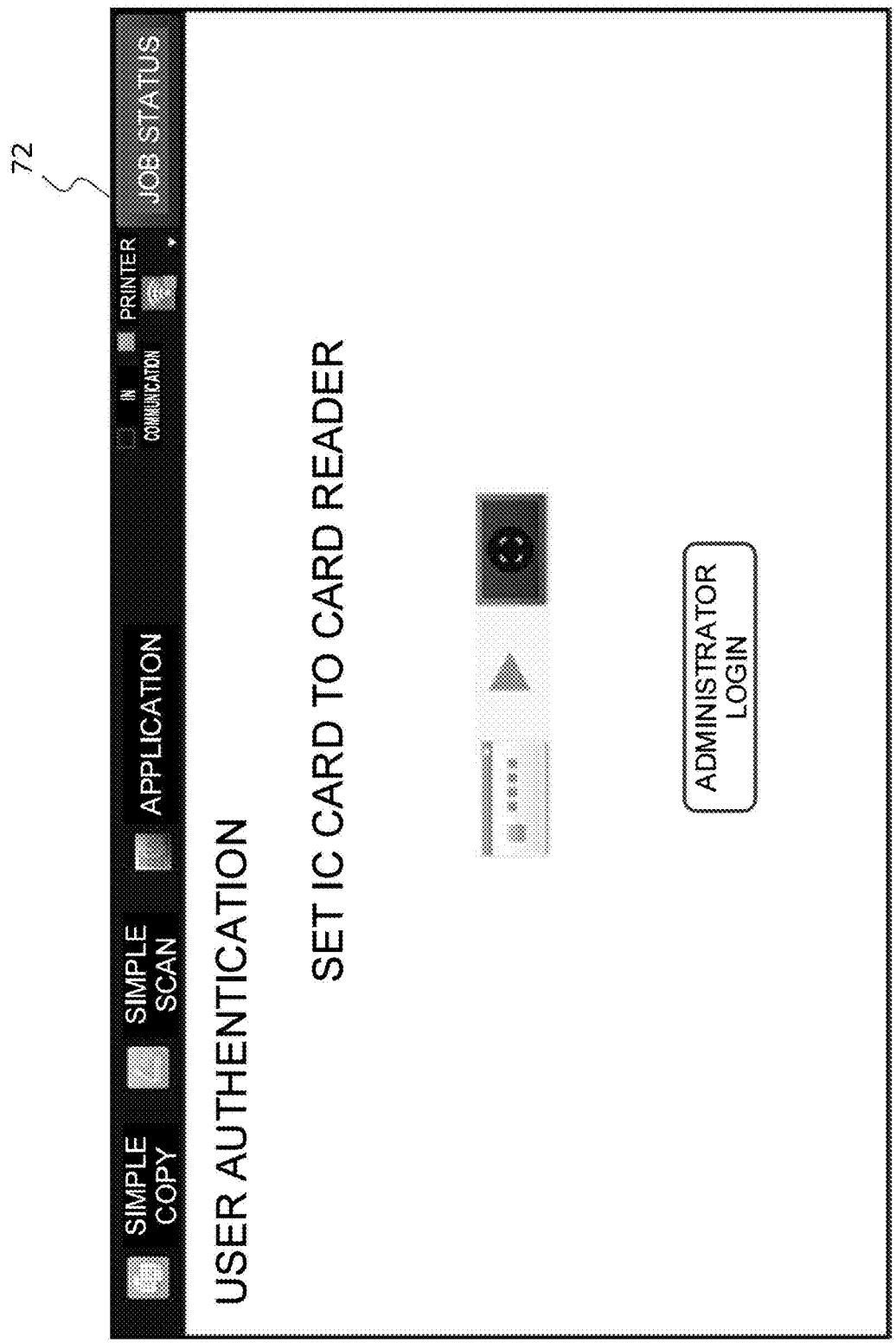

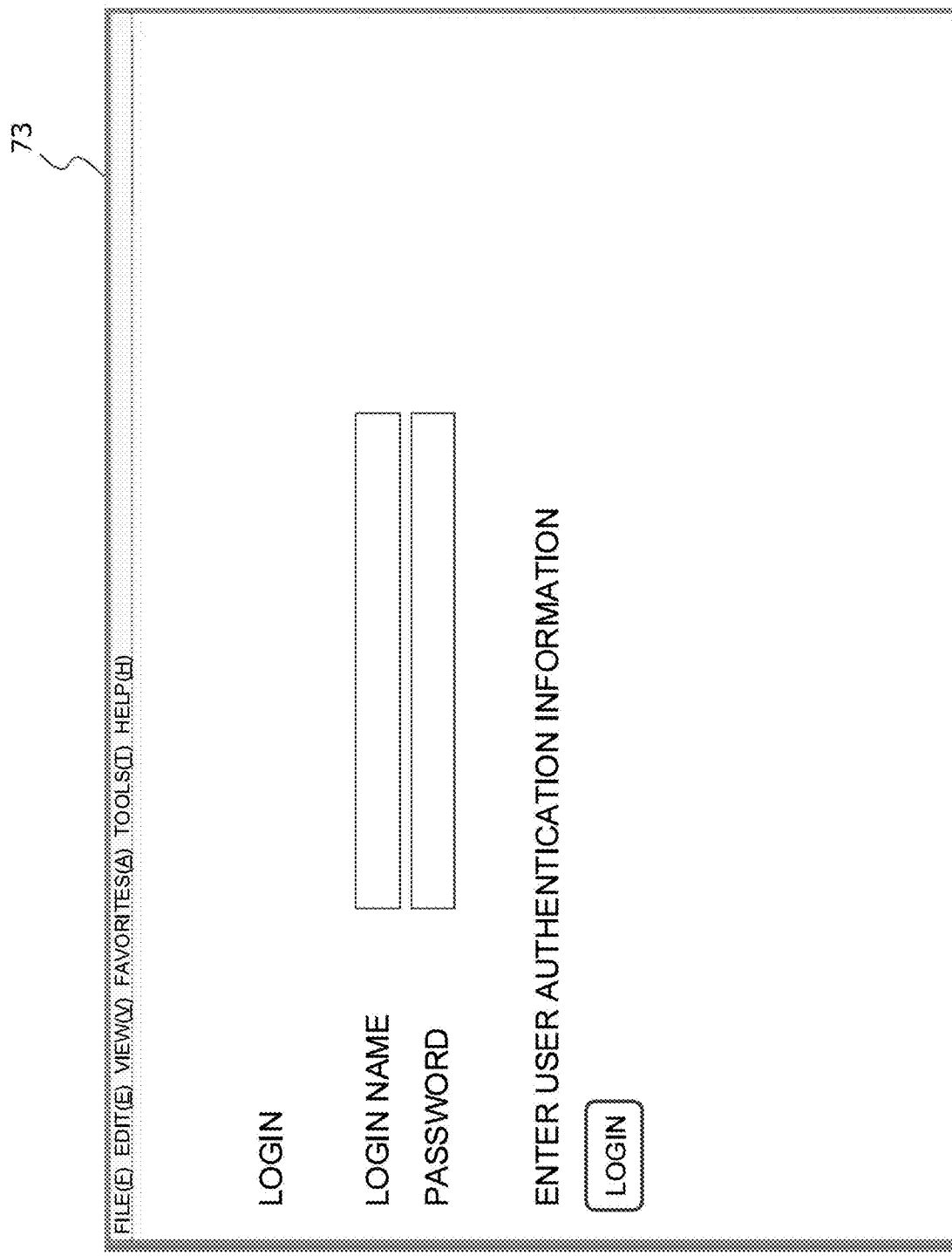

FIG. 5

| SUPPLY INFORMATION | |
|---|---|
| SUPPLY NAME | STATUS |
| BLACK TONER | 75% OR MORE |
| CYAN TONER | 50% OR MORE |
| MAGENTA TONER | 50% OR MORE |
| YELLOW TONER | 50% OR MORE |

SERIAL NUMBER : 1 2 3 4 1 2 3 4 1 2 3 4
NAME : NOT SET
PRODUCT NAME : MX-XXXX
INSTALLATION LOCATION : HEADQUARTERS FACTORY 6TH FLOOR
CURRENT STATUS : ONLINE
NOTE : NOT SET

USER NAME : XX
LOGOUT

Tabs: STATUS | ADDRESS BOOK | FILE OPERATION | USER MANAGEMENT | SYSTEM SETTING | SHORTCUT STATUS items:
- MULTIFUNCTIONAL APPARATUS INFORMATION
- DISPLAY TOTAL NO. OF USED SHEETS
- DEVICE STATUS
- FIRMWARE VERSION
- DATA LIST

USER AUTHENTICATION MANAGEMENT DEVICE, IMAGE PROCESSING APPARATUS INCLUDING THE SAME, USER AUTHENTICATION MANAGEMENT METHOD, AND STORAGE MEDIUM

BACKGROUND OF THE INVENTION

Field of the Invention

The present invention relates to a user authentication management device, an image processing apparatus including the user authentication management device, a user authentication management method, and a storage medium. More specifically, the present invention relates to a user e authentication management device and the like for selecting any one of a plurality of authentication schemes to perform user authentication.

Description of the Background Art

A device or a system in which a plurality of devices are connected by a network includes a function and a setting operable by all users and data accessible to all users, and also includes a function and a setting that should only be operable by some users and data that should only be accessible to some users.

Accordingly, a user authentication function is introduced to distinguish whether a user is to be granted access (whether the user is authorized). Typically, a user ID and a password are registered in a device in advance. A user who uses the device logs in to the device using a user ID and a password of the user. In this way, only a user registered in the device can operate the device and access the data. Further, each registered user is associated with an authority of the user, and an operable range and an accessible range of data are also controlled according to the authority of the user.

Further, a user authentication function of the device (hereinafter referred to as internal authentication) is sufficient in some cases. However, in the case of a network system in which a plurality of devices are connected via a network (hereinafter simply referred to as system), it is not easy to register user information related to user authentication in each device in the system and manage the user information. Therefore, there is a demand for a unified management of user information in the system. To fulfill this demand, a procedure is known in which an authentication server that manages user authentication and user information is provided in the system (see, for example, Japanese Unexamined Patent Application Publication No. 2005-109748).

In this case, if the user inputs a user ID and a password to perform a login request, the user ID and the password input as identification information of the user are transmitted to the authentication server to perform identification and authentication related to the login request. In response to the received identification and authentication request (including the user ID and the password as the identification information), the authentication server provides user information indicating, for example, whether the user is a registered user and also a type of an attribute of the user. Each device in the system determines whether an operation or an access by the user is permitted based on the user information provided by the authentication server arranged outside the device. Further, if the user information includes the authority of the user, the operable range and the accessible range are determined according to the authority of the user.

An object of the authentication server is to manage the user information in the system in a unified manner, and thus, only one authentication server is typically present in the system. If a user of the system logs in to the system with a unique user name and password, whether the user is permitted to operate and access an information device in the system and an authority of the user are determined in a unified manner, until the user logs off. A mechanism for logging in to a plurality of devices, services, and applications with one set of a user ID and a password is called a single sign-on function.

However, for example, there may be a case where a third party unrelated to the system individually develops and provides a service or an application, and the user needs to be authenticated by an authentication scheme prepared by the third party to utilize the service or the application. In this case, it is generally difficult for the user of the system to utilize the service or the application of the third party in the system. Even if a user attempts to access the system after being subjected to user authentication by the third party, the authentication server of the system only authenticates a user ID and a password registered in the authentication server of the system, and thus, treats the user as an unregistered user even if receiving the user information from the third party. The user authentication is only meaningful if an unregistered user is rejected in this way. That is, different authentication schemes are basically exclusive and cannot coexist.

Such a situation is appropriate for the system security, but inconvenient for the user. In the system, a user of the system cannot freely use a service and an application that cannot be used unless the user is subjected to user authentication by the authentication scheme of the third party (for example, a manufacturer of the device), and thus, the user cannot enjoy the convenience provided by the service and the application.

The present invention has been made in consideration of the above circumstances and makes it possible to subject a user to user authentication of different authentication schemes without requiring a complicated procedure.

SUMMARY OF THE INVENTION

The present invention provides a user authentication management device including a login request receiver that receives a login request from a user from a plurality of inputters via a path corresponding to each of the plurality of inputters, an authentication scheme selector that selects any one of a plurality of authentication schemes and provides identification information of the user related to the received login request to the selected authentication scheme to perform user authentication, and a user information storage that stores a user authentication result received from the selected authentication scheme as user information related to the user, in which the authentication scheme selector selects an authentication scheme predetermined corresponding to a path through which the login request is received.

In the user authentication management device according to the present invention, the authentication scheme selector selects an authentication scheme predetermined corresponding to a path through which the login request is received, and thus, it possible to subject a user to user authentication of different authentication schemes without requiring a complicated procedure. Therefore, it is possible for a user of the system to utilize by a simple procedure a service and an application that require user authentication by an authentication scheme different from an authentication system in a certain system, and to enjoy the convenience provided by the service and the application.

BRIEF DESCRIPTION OF DRAWINGS

FIG. 3 is an explanatory diagram illustrating a login screen using an IC card, which is displayed on the operation panel by the digital multifunctional apparatus of FIG. 1;

FIG. 4 is an explanatory diagram illustrating a web login screen displayed on an external device during a login operation from the external device to the digital multifunctional apparatus of FIG. 1;

FIG. 5 is an explanatory diagram illustrating an example of an application screen provided to a user who is logged in to the digital multifunctional apparatus of FIG. 1 (status screen);

DESCRIPTION OF THE PREFERRED EMBODIMENTS

The present invention will be described below in more detail with reference to the drawings. The following description is an exemplified illustration in all aspects and should not be interpreted to limit the present invention.

First Embodiment

Configuration Example of System

A configuration example of a system to which a user authentication management device of the present invention is applied will be described.

Figure 1:
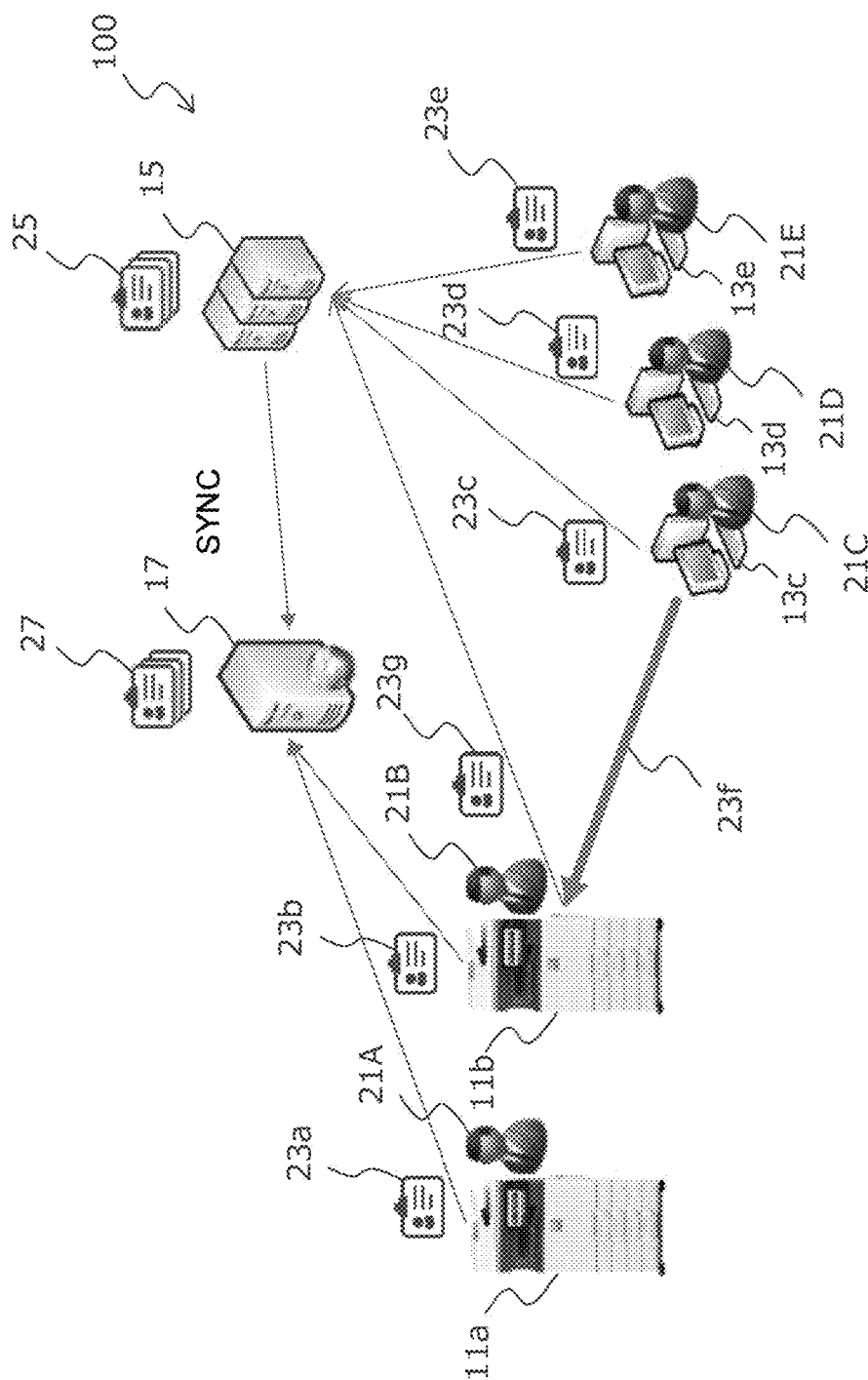
FIG. 1 is an explanatory diagram illustrating a configuration example of a system according to an embodiment of the present invention.

FIG. 1 is an explanatory diagram illustrating a configuration example of a system in the present embodiment. A system 100 of FIG. 1 includes digital multifunctional apparatuses 11a and 11b, administrator PCs 13c, 13d, and 13e, a first authentication server 15, and a second authentication server 17, and these devices are connected by a network. Other devices not illustrated in FIG. 1 may be further connected. The digital multifunctional apparatus (also referred to as a multifunction peripheral or MFP) is a typical example of an image processing apparatus, and serves as one of the apparatuses on the network to provide an application unique to the apparatus in the form of a web page. If a user logs in to the web page, the user can acquire a state of the apparatus and also change a setting of the apparatus.

Further, the digital multifunctional apparatuses 11a and 11b each include an operation panel, and a user who uses the digital multifunctional apparatus 11a or 11b can input a login name corresponding to a user ID and a password on the operation panel to be subjected to user authentication. For example, a general user 21A who uses the digital multifunctional apparatus 11a goes to a place where the digital multifunctional apparatus 11a is installed, and logs in by inputting a login name and a password which are unique to the general user 21A into the operation panel. A user who is logged in via the operation panel can not only use the digital multifunctional apparatus 11a or 11b, but also acquire a state of the apparatus and change a setting of the apparatus on the operation panel as in the above-described web page.

Figure 2:
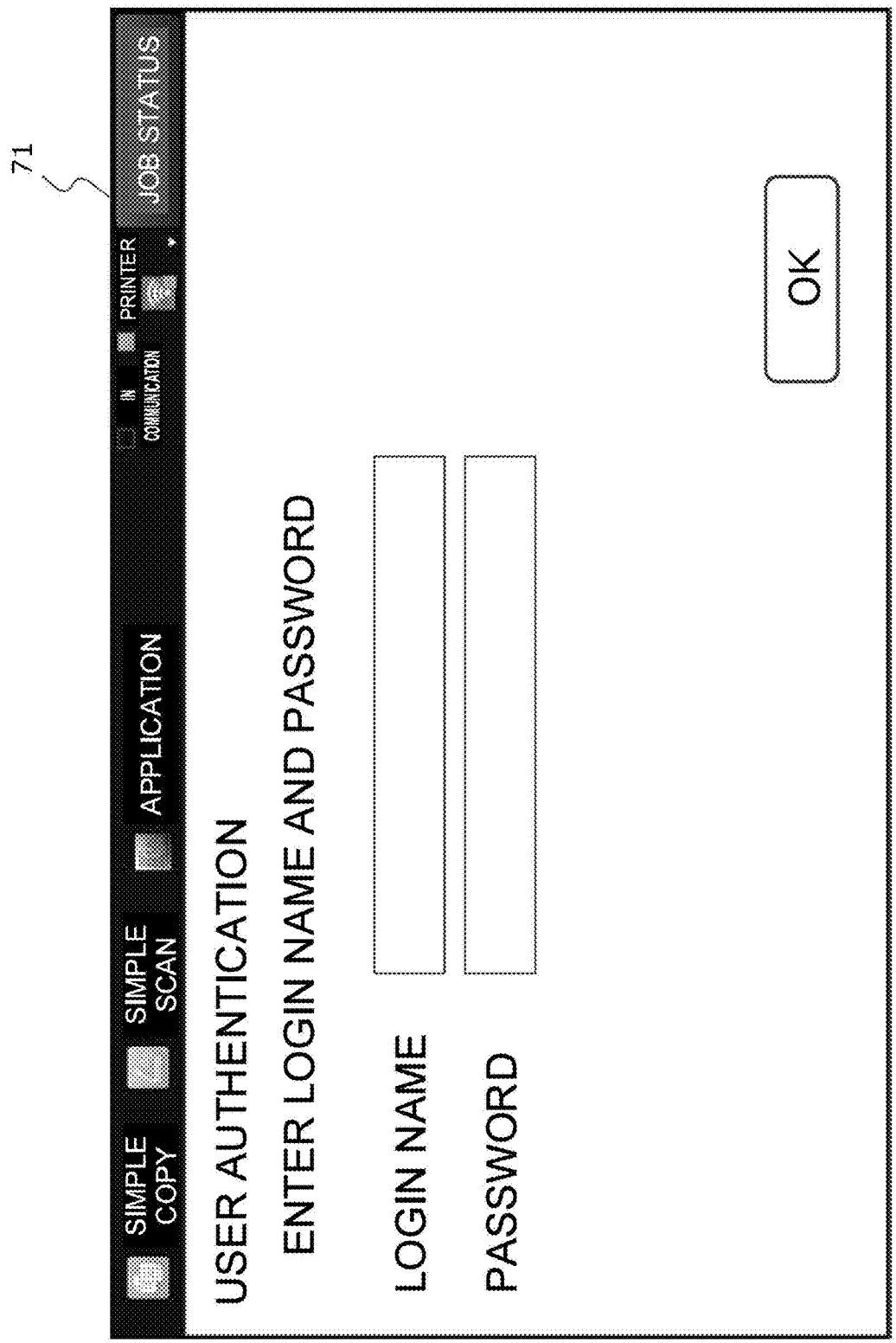
FIG. 2 is an explanatory diagram illustrating a login screen using a login name and a password, which is displayed on an operation panel by a digital multifunctional apparatus of FIG. 1.

FIG. 2 is an explanatory diagram illustrating a login screen for inputting a login name and a password, which is displayed on the operation panel by the digital multifunctional apparatus illustrated in FIG. 1.

As illustrated in FIG. 2, a login screen 71 is displayed if a user performs a predetermined operation on the operation panel. The user can input the login name and the password and touch an "OK" button on the displayed login screen 71 to be subjected to user authentication.

If the login name and the password are input on the login screen 71 and the "OK" button is touched, an identification and authentication request 23a including the login name and the password for identification and authentication related to login is transmitted from the digital multifunctional apparatus 11a to the second authentication server 17 via the network. If receiving the identification and authentication request 23a, the second authentication server 17 determines whether a user identified by the login name and the password is already registered in registered account information 27.

If the user is registered in the registered account information 27, the second authentication server 17 transmits, as user information to the digital multifunctional apparatus 11a, a reply indicating that the user related to the identification and authentication request 23a is already registered. If the user is an unregistered user, a reply indicating that the user is an unregistered user is transmitted to the digital multifunctional apparatus 11a as user information. In the case of a registered user, an attribute of the user may be added. An example of the attribute is a department to which the user belongs.

If receiving the user information as a user authentication result from the second authentication server 17, the digital multifunctional apparatus 11a receives an operation from the user if the user is a registered user. That is, the general user 21A is permitted to use the apparatus. If the user is an unregistered user, the operation by the user is not received or the user is permitted to use the apparatus within an allowable range for unregistered users.

The same applies to the digital multifunctional apparatus 11b. If a general user 21B inputs a login name and a password on the operation panel, an identification and authentication request 23b is transmitted to the second authentication server 17. The second authentication server 17 determines whether the user identified by the login name and the password is already registered in the registered account information 27, and transmits user information of a determination result as a reply to the digital multifunctional apparatus 11b. The digital multifunctional apparatus 11b determines whether to permit use of the apparatus by the general user 21B based on the received user information.

In FIG. 1, the second authentication server 17 synchronizes the content of the registered account information 27 with registered account information 25 of the first authentication server 15. However, this synchronization is neither bidirectional nor in real time. The second authentication server 17 periodically acquires a content of the registered account information 25 from the first authentication server 15 to avoid as far as possible inconsistency between the registered account information 27 and the registered account information 25.

In the present embodiment, a login method from the digital multifunctional apparatus 11a or 11b is not limited to the method using the login screen 71. The login may be performed using a non-contact IC card.

FIG. 3 is an explanatory diagram illustrating a login screen using an IC card, which is displayed on the operation panel by the digital multifunctional apparatus illustrated in FIG. 1. A login screen 72 displays an icon indicating an operation procedure for holding the non-contact IC card over a specific location. Further, an administrator login button for selecting whether to log in as an administrator is provided.

The IC card stores in advance information corresponding to an input of a login name and a password (however, the information is not limited to the login name and the password), and if the IC card is held over a predetermined location, the information stored in the IC card is transmitted as a login request to the digital multifunctional apparatus 11a side.

In the case of the login screen 71 of FIG. 2, for example, one user may register in advance two passwords for administrator login and user login to distinguish between the administrator login and the user login. However, each user usually possesses one IC card. Therefore, as illustrated in FIG. 3, the administrator login button may be used to distinguish between a login with user authority and a login with administrator authority by the same user (IC card). However, only a limited number of users (IC cards) can log in with administrator authority, and normal users (IC cards) can only log in with user authority.

An aspect is described above in which the user operates the digital multifunctional apparatus 11a or 11b to request login.

The digital multifunctional apparatuses 11a and 11b are connected to an external device via a network. For example, the digital multifunctional apparatuses 11a and 11b are connected to the administrator PCs 13c, 13d, and 13e.

In the present embodiment, the administrator PCs 13c, 13d, and 13e are administrators that manage devices of the system 100, including the digital multifunctional apparatuses 11a and 11b. The administrator does not need to manage all the devices of the system 100, but manages at least all the digital multifunctional apparatuses on the network.

If performing management work of the digital multifunctional apparatus, the administrator accesses the digital multifunctional apparatus via the network to perform the management work remotely. Here, the management work includes monitoring a usage condition (such as counter information and history of troubles or paper jams) of the digital multifunctional apparatus on the network, and performing setting of the digital multifunctional apparatus (for example, a setting related to an operation restriction).

An administrator 21C operates the administrator PC 13c to log in to the system 100 with a login name and a password that are unique to the administrator 21C.

FIG. 4 is an explanatory diagram illustrating a web login screen displayed on a screen of the administrator PC 13c by the digital multifunctional apparatus illustrated in FIG. 1.

As illustrated in FIG. 4, a web login screen 73 is displayed if the user performs a predetermined operation on the administrator PC 13c. More specifically, each of the digital multifunctional apparatuses 11a and 11b includes a network address that provides a screen after login illustrated in FIG. 5. If the administrator 21C accesses the network address on a web browser of the administrator PC 13c, the web login screen 73 is displayed. In FIG. 1, access from the administrator PC 13c to the above-mentioned network address is indicated by an arrow as a network access 23f.

If the user inputs a login name and a password unique to the user and touches a "login" button on the displayed web login screen 73, the digital multifunctional apparatus 11a or 11b receives a web login request. In the present embodiment, the first authentication server 15 is an LDAP authentication server and provides a single sign-on function. The administrator 21C inputs the one login name (user ID) and password assigned to the administrator 21C in the system 100 on the web login screen 73 to log in to the system 100. That is, a password for administrator login and a password for user login are not distinguished for use.

If the web login request is received on the web login screen 73, the digital multifunctional apparatus 11a or 11b provides identification information 23g related to the received web login request to the first authentication server 15 (identification and authentication request). The identification information 23g includes the login name and the password input on the web login screen 73. Here, it is assumed that the digital multifunctional apparatus 11b receives the web login request.

If receiving the identification information 23g, the first authentication server 15 determines whether a user identified by the login name and the password is already registered in the registered account information 25, which is one type of database based on an LDAP specification.

If the user is a registered user, a reply indicating that the user related to the identification information 23g is already registered is transmitted as user information to the digital multifunctional apparatus 11b that transmits the identification information 23g. If the user is an unregistered user, a reply indicating that the user is an unregistered user is transmitted to the digital multifunctional apparatus 11b as user information.

In the case of a registered user, an attribute of the user may be added. An example of the attribute is an authority of the user. The authority of the user includes, for example, administrator authority and user authority for a general user. If the user has administrator authority, the user can perform a setting and an operation that are not permitted with user authority. Any one of user authority or administrator authority is registered for each user. The administrator 21C is registered as a user having administrator authority.

The registered account information 25 according to the LDAP is used for managing detailed information about the user and can be provided as the user information.

In the present embodiment, it is assumed that the registered account information 27 of the second authentication server 17 manages users by a data structure simpler than the LDAP. In particular, it is assumed that the registered account information 27 does not have a function of providing information related to the authority of the user as the user information.

If receiving the user information as a user authentication result from the first authentication server 15, the digital multifunctional apparatus 11b receives an operation from the user if the user is a registered user. That is, the administrator 21C is permitted to log in to the system 100 with administrator authority. If the user is an unregistered user, the operation by the user is not received or an operation within an allowable range for unregistered users is received.

The administrator 21C who is logged in to the digital multifunctional apparatus 11b as an administrator can access the digital multifunctional apparatus 11b as an administrator and perform management work.

Figure 6:
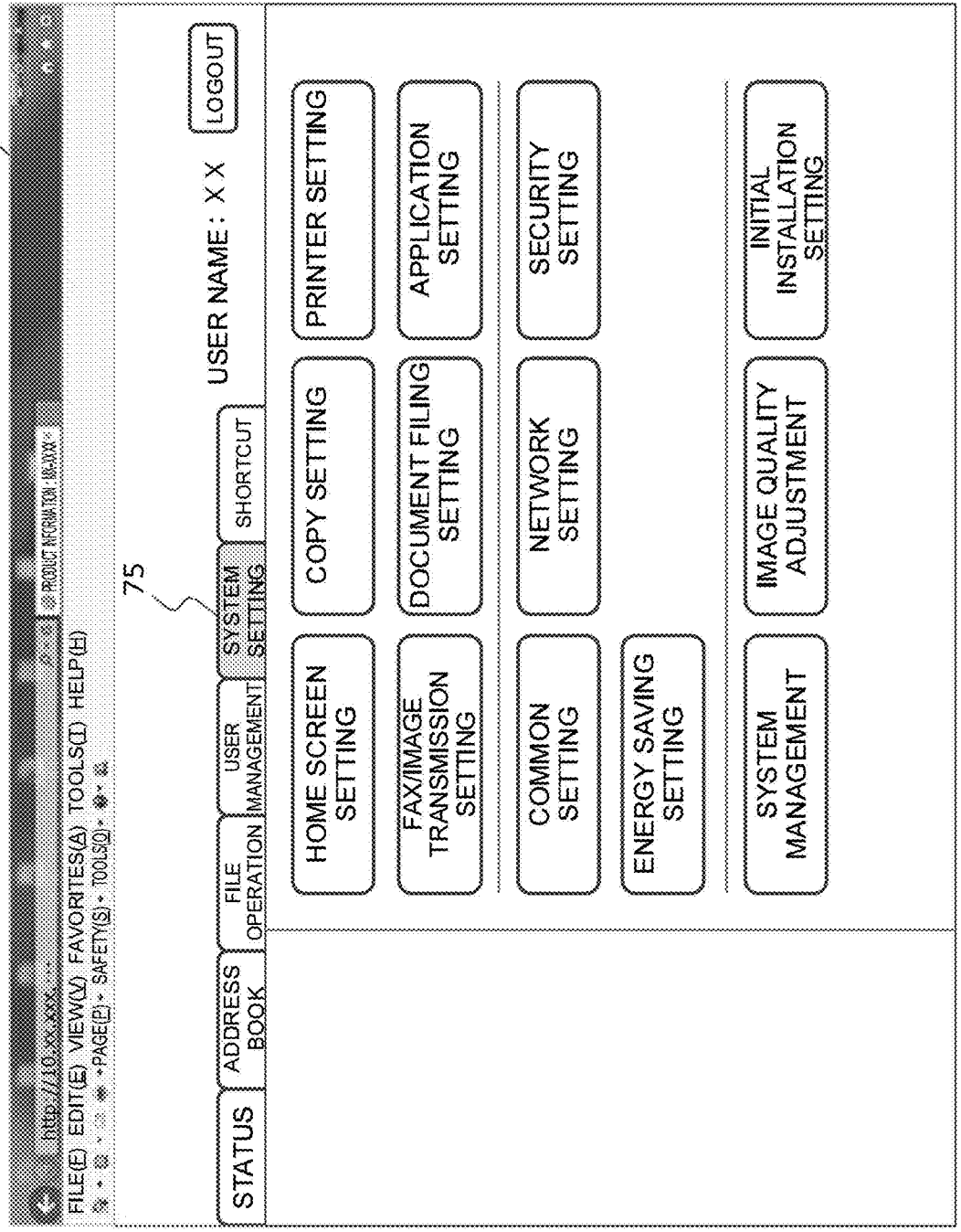
FIG. 6 is an explanatory diagram illustrating an example of an application screen provided to a user who is logged in to the digital multifunctional apparatus of FIG. 1 (system setting screen)

FIGS. 5 and 6 are explanatory diagrams illustrating screens of services and settings provided by the digital multifunctional apparatus 11b to a user logged in by a web login.

FIG. 5 is an example of a status screen, in which a state of the digital multifunctional apparatus 11b is displayed on a browser screen after the web login of the administrator PC 13c. In the present embodiment, a status screen 74 is accessible not only by the administrator, but also the user who performs a web login with user authority, and similar screens are displayed.

A plurality of tabs arranged in a horizontal row are displayed in an upper part of the status screen 74 illustrated in FIG. 5. If a clicking operation on each of the tabs is performed, the screen switches to a screen corresponding to the tab. For example, if a clicking operation to a "system setting" tab 75 is performed, the screen transitions to a system setting screen 76 illustrated in FIG. 6.

The system setting screen 76 includes various settings categorized into a plurality of items, such as a setting related to a home screen displayed on the operation panel, a setting related to copying, a setting related to printing, a setting related to fax transmission and image transmission, a setting related to document filing, and a setting related to an application. In addition, a setting common to these items, a setting related to a network, a setting related to security, a setting related to energy saving, and the like are provided.

The administrator 21C can click a button of each classification setting item to access an individual setting item belonging to the clicked classification. Then, a setting of the individual setting item can be changed.

As described above, if the administrator 21C operates the system setting screen 76 displayed on the administrator PC 13c, the administrator 21C can remotely change a setting of the digital multifunctional apparatus 11b.

In the case of the system setting screen 76 illustrated in FIG. 6, a user who performs a web login with user authority can access a part of the items. However, there are items to which access is not permitted. That is, there are items for which a change of the setting is not permitted.

The same applies to a case where a web login is performed to the digital multifunctional apparatus 11a. The same also applies to a case where a web login is performed from the administrator PCs 13d and 13e.

For example, if an administrator 21D accesses the digital multifunctional apparatus 11a from the administrator PC 13d and inputs a login name and a password of the administrator 21D on the web login screen, the digital multifunctional apparatus 11a transmits identification information 23d related to the received login request to the first authentication server 15. The first authentication server 15 determines that the administrator 21D identified by the login name and the password is already registered as an administrator in the registered account information 25, and transmits user information of the determination result as a reply to the digital multifunctional apparatus 11a. Based on the user information, the administrator 21D can log in to the digital multifunctional apparatus 11a as an administrator from the administrator PC 13d. Then, the administrator 21D can access the digital multifunctional apparatus 11a as an administrator to perform the management work.

The same applies to the administrator PC 13e. If an administrator 21E accesses the digital multifunctional apparatus 11a from the administrator PC 13e and inputs a login name and a password of the administrator 21E on the web login screen, the digital multifunctional apparatus 11a transmits identification information 23e related to the received login request to the first authentication server 15. The first authentication server 15 determines that the administrator 21E identified by the login name and the password is already registered in the registered account information 25, and transmits the user information of the determination result as a reply to the digital multifunctional apparatus 11a. Based on the user information, the administrator 21E can log in to the digital multifunctional apparatus 11a from the administrator PC 13e. Then, the administrator 21E can access the digital multifunctional apparatus 11a as an administrator to perform the management work.

It is noted that a network address for displaying the web login screen described above is an address set for performing a login to the digital multifunctional apparatuses 11a and 11b in the system 100. By contrast, a case where the administrator PCs 13c, 13d, and 13e log in to each of the PCs is slightly different. If the administrator PC logs in to the system 100, a login screen for login to the system 100 is displayed on each of the administrator PCs 13c, 13d, and 13e. The user inputs a login name and a password of the user on the displayed login screen. Then, identification information related to the login request to the system 100 is transmitted to the first authentication server 15. For example, identification information 23c is transmitted from the administrator PC 13c to the first authentication server 15. Further, the identification information 23d is transmitted from the administrator PC 13d to the first authentication server 15. Alternatively, the identification information 23e is transmitted from the administrator PC 13e to the first authentication server 15. The pieces of identification information 23c, 23d, and 23e include the input login name and password. In response to the identification and authentication request, user information as an authentication result is transmitted as a reply from the first authentication server 15 to the administrator PC 13c, 13d or 13e being the transmission source. Based on the transmitted user information, a registered user can log in to the system 100 from the administrator PC 13c, 13d, or 13e.

Configuration Related to User Authentication of Digital Multifunctional Apparatus Next, a configuration of the digital multifunctional apparatus related to user authentication will be described.

Figure 7:
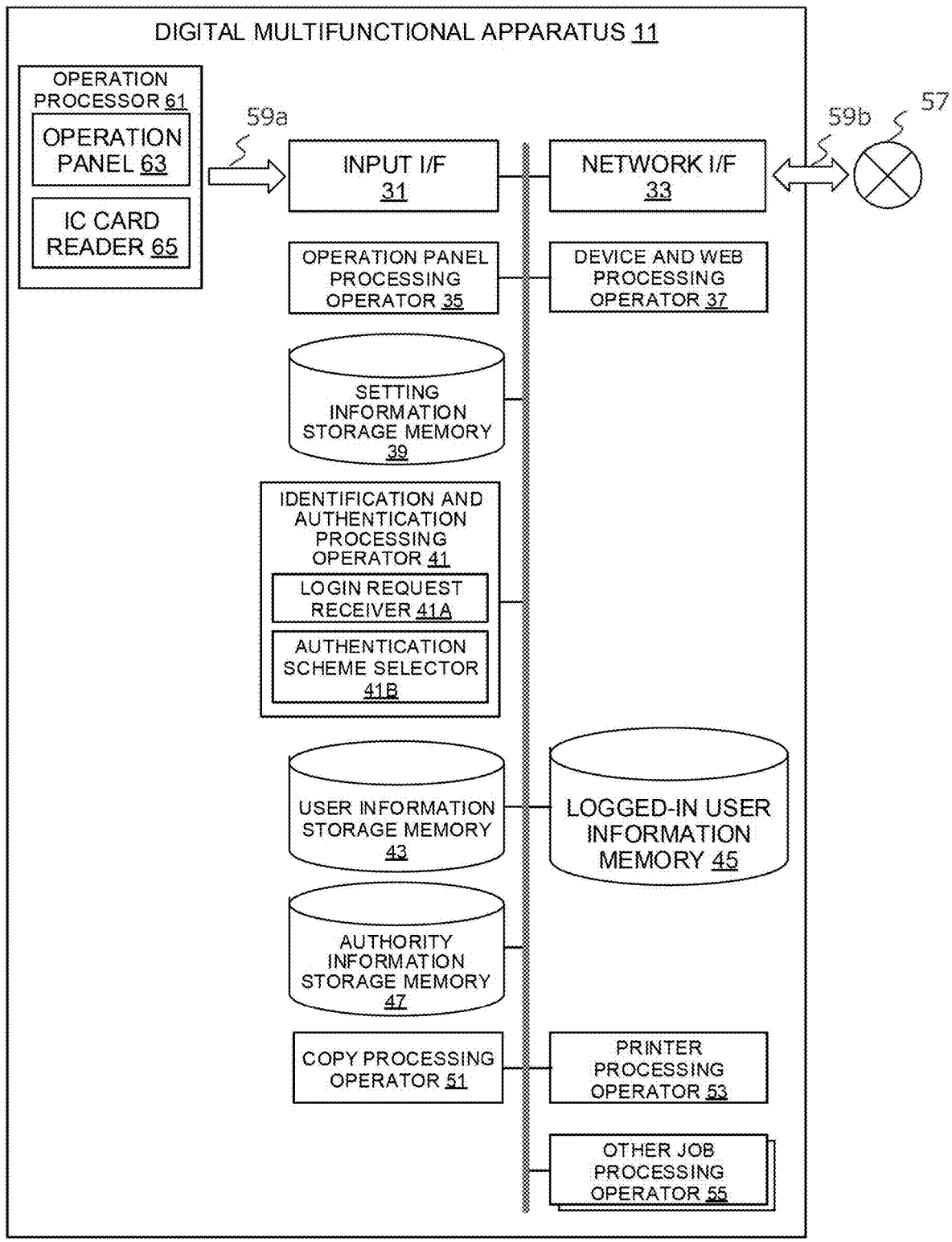
FIG. 7 is a block diagram illustrating a configuration of the digital multifunctional apparatus illustrated in FIG. 1 from the viewpoint of a user authentication process.

FIG. 7 is a block diagram illustrating a configuration of the digital multifunctional apparatus illustrated in FIG. 1 from the viewpoint of a user authentication process. The digital multifunctional apparatuses 11a and 11b illustrated in FIG. 1 have a similar configuration, and thus, are described as the digital multifunctional apparatus 11.

As illustrated in FIG. 7, the digital multifunctional apparatus 11 includes a copy processing operator 51 that performs a copy process, a printer processing operator 53 that performs a printing process, and an other-job processing operator 55 that processes another job. The other job refers to a job other than copying and printing. For example, the other job includes fax transmission, image transmission, fax reception, document filing, and the like. The type of job is not closely related to the user authentication, and thus, jobs other than the typical copy and printer jobs are collectively illustrated in FIG. 7 in a simplified manner.

An operation processor 61 is a hardware resource for receiving an input from the user. The operation processor 61 includes an operation panel 63 and an IC card reader 65.

Information input using the operation processor 61 is transmitted to an input interface 31 via an internal path 59a. The input interface 31 is a communication interface circuit that transmits and receives data within the digital multifunctional apparatus 11.

A login request from the operation processor 61 is transmitted to the input interface 31 and further transmitted to an identification and authentication processing operator 41 described below.

On the other hand, the digital multifunctional apparatus 11 is connected to a network 57 of the system 100 via a network interface 33. Communications with external devices (the administrator PCs 13c, 13d, and 13e, the first authentication server 15, and the second authentication server 17) illustrated in FIG. 1 are performed via the network interface 33. The network interface 33 is a communication interface circuit with the network.

For example, a web login request from the administrator PC 13c is transmitted to the network interface 33 via an external path 59b, and is further transmitted to the identification and authentication processing operator 41.

The identification and authentication processing operator 41 includes a login request receiver 41a and an authentication scheme selector 41b. The identification and authentication processing operator 41 is configured by a circuit mainly including a CPU and a memory as hardware resources, and a function of the identification and authentication processing operator 41 is realized if the CPU executes a program stored in the memory.

The login request receiver 41a receives a login request transmitted from the operation panel 63 via the input interface 31 through the internal path 59a. Further, the login request receiver 41a receives a web login request transmitted from the external device such as the administrator PC 13c, 13d, or 13e via the network interface 33 through the external path 59b.

The authentication scheme selector 41b selects an authentication scheme to be used for user authentication for the received login request and web login request. That is, the authentication scheme selector 41b determines whether to transmit the login name and the password included in the login request and the web login request to the first authentication server 15 to perform user authentication using a first authentication scheme, or to the second authentication server 17 to perform user authentication using a second authentication scheme.

Specifically, the authentication scheme selector 41b according to the present embodiment selects the authentication scheme based on whether the path through which the login request or the web login request is received is the internal path 59a or the external path 59b. The first authentication scheme is selected for the web login request received through the external path 59b, and identification information including the received login name and password is transmitted to the first authentication server 15. On the other hand, the second authentication scheme is selected for the login request received through the internal path 59a, and identification information including the received login name and password is transmitted to the second authentication server.

However, in a situation where communication with the first authentication server 15 or the second authentication server 17 is not possible at the time of receiving the login request, the authentication scheme selector 41b selects an internal authentication completed within the digital multifunctional apparatus 11. If the communication with the first authentication server 15 or the second authentication server 17 is interrupted at the time of receiving the login request, the user may be confused if the user authentication cannot be performed. Therefore, if the communication with the first authentication server 15 or the second authentication server 17 is not possible at the time of login, the internal authentication is selected. The digital multifunctional apparatus 11 can be used regardless of whether the user authentication is performed by the authentication server or the internal authentication.

As described above, the authentication scheme selector 41b basically selects the first authentication scheme for the web login request received through the external path 59b, and selects the second authentication scheme for the login request received through the internal path 59a.

An operation panel processing operator 35 performs a process of receiving a user input performed on the operation panel 63, and controls a content to be displayed on a screen of the operation panel 63. The operation panel processing operator 35 is configured by a circuit mainly including a CPU and a memory as hardware resources, and a function of the operation panel processing operator 35 is realized if the CPU executes a program stored in the memory. The operation panel processor 35 may share hardware resources with the above-mentioned identification and authentication processing operator 41.

A device and web processing operator 37 provides a web screen to a user logged in to the digital multifunctional apparatus 11. For example, the web screens of the digital multifunctional apparatus 11 illustrated in FIGS. 4 to 6 are provided. Further, the device and web processor 37 determines a web screen to be displayed depending on whether the logged-in user has user authority or administrator authority. The device and web processing operator 37 is configured by a circuit mainly including a CPU and a memory as hardware resources, and a function of the device and web processing operator 37 is realized if the CPU executes a program stored in the memory. The device and web processor 37 may share hardware resources with the above-mentioned identification and authentication processing operator 41.

A setting information storage memory 39 is a non-volatile memory that stores a setting of the digital multifunctional apparatus 11 set on the system setting screen illustrated in FIG. 6, for example.

A user information storage memory 43 is a non-volatile memory that stores information on the user logged in to the digital multifunctional apparatus 11. Information on a user most recently logged in to the digital multifunctional apparatus 11 is held for a predetermined number of users or a predetermined capacity. The internal authentication not passing through the authentication server is performed by using user information stored in the user information storage memory 43. The user information stored in the user information storage memory 43 is associated with information related to the authority of each user stored in an authority information storage memory 47 described below.

A logged-in user information memory 45 holds information about a user currently logged in. The user information stored in the logged-in user information memory 45 is associated with the information related to the authority of each user stored in the authority information storage memory 47 described below.

The authority information storage memory 47 holds and manages information related to the authority of the user, such as whether a user logged in to the digital multifunctional apparatus 11 has administrator authority or user authority. If information related to the authority is received from the LDAP authentication server, the digital multifunctional apparatus 11 sets and manages information related to the authority of the user based on the received information, and performs a process according to the authority of the user.

The information related to the authority of the user is held in the authority information storage memory 47.

The first authentication server 15 provides, as user information, information related to the authority of a user who requests login. The digital multifunctional apparatus 11 manages a type of operation permitted according to the authority of the user.

Combined Use and Adjustment of First Authentication Scheme and Second Authentication Scheme An application is provided to collectively manage a plurality of digital multifunctional apparatuses. An interface that monitors an internal state of the digital multifunctional apparatus 11 and controls the digital multifunctional apparatus 11 from the outside to allow for cooperation with the application is defined and published. However, the provided application mainly provides counter information of the digital multifunctional apparatus 11. The need for an application that changes a setting of the digital multifunctional apparatus 11 and an application that controls the digital multifunctional apparatus 11 is limited, and thus, these applications are not provided as general-purpose applications.

However, even if only the counter information is provided, there is a security problem in that all users can freely access the information, and thus, an individual simple authentication scheme is adopted. Below, user authentication performed by this authentication scheme will be referred to as simple authentication in the present specification.

A user authenticated by the simple authentication can use the above-described application for providing the counter information. The counter information of each of the digital multifunctional apparatuses 11 can be acquired by logging in to each of the digital multifunctional apparatuses 11 and accessing the status screen 74 illustrated in FIG. 5. In addition, if the above-described application is used, it possible to acquire the pieces of counter information of the plurality of digital multifunctional apparatuses 11 on the network in a unified manner.

The application for providing counter information can collect necessary information if a login with user authority is performed to each of the digital multifunctional apparatuses 11 on the network so that the status screen 74 illustrated in FIG. 5 is obtained.

On the other hand, there is an administrator who remotely operates and maintains the plurality of digital multifunctional apparatuses 11 on the network. It is noted that the digital multifunctional apparatus 11 is an example of a device on the network to be managed by the administrator, and may be an image processing apparatus different from the device on the network or a device other than the image processing apparatus. The device is not limited to the digital multifunctional apparatus as long as the device relates to user authentication.

In the present embodiment, the administrator manages and performs maintenance of at least the digital multifunctional apparatus 11 on the network.

Further, in the present embodiment, the administrator is registered as a user of the system 100 with administrator authority, and the first authentication server 15 performs the user authentication and provides the single sign-on function. The first authentication server 15 is an LDAP authentication server.

That is, an administrator registered in the system 100 uses the user information (user name, password, and the like) registered in the existing LDAP authentication server of the system as it is to maintain and manage the digital multifunctional apparatus 11 in the system 100.

As described above, there is an existing application for providing the counter information of the digital multifunctional apparatus 11 on the network by using the simple authentication, and it is assumed that a general user uses this application.

Acquiring the counter information of the digital multifunctional apparatus 11 on the network is a part of the work to be performed by the administrator, however, the work of the administrator is not limited to this, and includes work for changing the setting of the digital multifunctional apparatus 11 with administrator authority. In the present embodiment, the administrator uses an individual application (administrator application) that supports the entire work to be performed by the administrator. The administrator does not use the existing application for general users that provides the counter information.

The administrator application changes the setting, and thus, it is necessary to log in to each of the digital multifunctional apparatuses 11 with administrator authority. The first authentication server 15 (LDAP authentication server) that manages the user authentication of the system 100 is used.

Basically, different authentication schemes (simple authentication and LDAP authentication) cannot coexist. However, as described above, there is a case where it is desired that different authentication schemes coexist.

That is, it is desired that a general user can use the existing application for providing the counter information by using the simple authentication, while the administrator can use the administrator application by using the LDAP authentication server.

Here, additional description will be provided as to whether such inconvenience occurs if the administrator logs in to the second authentication server 17 by the simple authentication.

In the present embodiment, if an administrator is registered and logged in to the second authentication server 17 using the simple authentication scheme, the authority (administrator authority) required to perform maintenance of the digital multifunctional apparatus 11 cannot be acquired.

This is because it is assumed that the application for providing counter information by using the simple authentication is used with user authority. Various operations such as changing the setting of the digital multifunctional apparatus 11 with administrator authority are not provided, and identification management between user authority and administrator authority is not supported. The user information transmitted as a reply by the second authentication server 17 that receives the identification and authentication request does not include information related to the authority of the user.

If receiving the user information from the second authentication server, the digital multifunctional apparatus 11 treats the authenticated user as a general user. In other words, the authenticated user is treated as a general user with the lowest authority. From a viewpoint of the security, it is not possible to impart additional authority (in this case, administrator authority) to a user if the authority of the user is unclear.

As a result, even an administrator can obtain only user authority as a general user, and can perform not the entire work, but only a part of the work as an administrator.

To solve this problem, in the present embodiment, the authentication scheme selector 41*b* selects in principle any one of the first authentication server 15 and the second authentication server 17 according to the path through which the login request is received.

It is considered that most general users go to a place where the digital multifunctional apparatus 11 is installed to operate the operation panel. On the other hand, the administrator is expected to remotely operate the digital multifunctional apparatus 11 to perform the work of the administrator.

That is, it is considered that general users perform a login request through the internal path 59*a*, and the administrator performs a web login request through the external path 59*b*.

Therefore, the LDAP authentication by the first authentication server 15 is performed for the web login request through the external path 59*b* so that administrator authority is imparted if a login to the digital multifunctional apparatus 11 is performed. The LDAP authentication server provides various types of information related to the user as user information, and the user information also includes information related to the authority imparted to each user.

On the other hand, the simple authentication by the second authentication server 17 is performed for the login request through the internal path 59*a*. During the login to the digital multifunctional apparatus 11, the user information transmitted as a reply from the authentication server by the simple authentication does not include information related to the authority, and thus, the user is treated as a general user when logging in to the digital multifunctional apparatus 11, which is no problem if the user is a general user.

It is noted that a general user may perform a web login to the digital multifunctional apparatus 11 via the network. In a case where a general user performs a web login, if the user is registered as a general user in the first authentication server 15, the first authentication server 15 transmits user information as a reply indicating that the user is a registered user and has user authority. Based on the user information, the digital multifunctional apparatus 11 treats the logged-in user as a general user, and not as an administrator.

If a user who is not registered in the first authentication server 15 performs a web login, the first authentication server 15 transmits as a reply an error indicating that the user is not registered, as the user information. This is because there is a security problem if an unregistered user logs in. Therefore, the digital multifunctional apparatus 11 rejects the login request from the user.

Second Embodiment

In the first embodiment, if an unregistered user performs a web login to the digital multifunctional apparatus 11 and an error is transmitted as a reply from the first authentication server 15 as user information, the login request from the user is rejected. However, the user may be registered in the second authentication server 17. As described with reference to FIG. 1, the second authentication server 17 synchronizes the content of the registered account information 27 with the registered account information 25 of the first authentication server 15, and thus, bidirectional synchronization is not performed. That is, even if a user is registered in the second authentication server 17, the user is not automatically registered in the first authentication server 15 by synchronization. Due to this situation, different authentication schemes are basically exclusive and cannot coexist.

However, it is possible to improve such a situation.

In the present embodiment, if an error is transmitted as user information from the first authentication server 15 in response to the web login, if receiving the error, the authentication scheme selector 41*b* subsequently transmits identification information to the second authentication server 17. The identification information to be transmitted to the second authentication server 17 includes a login name and a password input in the initial web login. That is, the identification information is the login name and the password for which the error is transmitted as a reply from the first authentication server 15.

If the user is registered in the second authentication server 17 that receives the identification and authentication request, the second authentication server 17 transmits, as user information, a reply indicating that the user is already registered. Based on the user information, the digital multifunctional apparatus 11 permits the login of the user with user authority.

According to the present embodiment, if a general user who uses an application using the simple authentication performs a web login, the web login is not rejected and the login is performed by the simple authentication. On the other hand, if the administrator performs a web login, the first authentication server 15 permits the web login of the administrator, similarly to the first embodiment, and thus, the administrator can acquire administrator authority and use the administrator application.

In FIG. 1, there are two authentication servers (the first authentication server 15 and the second authentication server 17), but there may be three or more authentication servers.

For example, if an error is transmitted as a reply from a first authentication server in response to the identification and authentication request, the authentication scheme selector 41*b* may transmit the identification and authentication request to a second authentication server. If an error is also transmitted as a reply from the second authentication server, the identification and authentication request may be further transmitted to a third authentication server.

In this way, if an authentication server transmits an error as a reply, the identification and authentication request is transmitted to another authentication server, and thus, if the user is registered in any one of the authentication servers, the user can log in after being subjected to authentication by the one authentication server.

Third Embodiment

In the second embodiment, if an error is transmitted as a reply from the first authentication server 15, an identification and authentication request is transmitted to the second authentication server 17.

That is, unless the first authentication server 15 transmits the error as the reply, the identification and authentication request is not transmitted to the second authentication server 17. If the same user is registered in a plurality of authentication servers, the authentication is performed by an authentication server to which the identification and authentication request is transmitted first, among the authentication servers in which the user is registered.

In the present embodiment, even if the user is registered in the first authentication server 15, if user information is transmitted as a reply indicating that the user has a specific authority (for example, user authority), the authentication scheme selector 41*b* transmits an identification and authentication request to the second authentication server 17. If the user is registered in the second authentication server 17, the authentication is performed by the second authentication scheme.

In this way, a web login from the administrator is authenticated by the first authentication server 15, and the authenticated administrator can use the administrator application.

On the other hand, if a general user performing a web login is a user registered in the first authentication server 15, user information indicating that the user has user authority is transmitted as a reply. If the authentication scheme selector 41b receives the user information indicating that the user has user authority, the authentication scheme selector 41b transmits the identification and authentication request to the second authentication server 17 so that the user is subjected to authentication by the second authentication server 17.

As a result, even if the user performing the login request is registered in the first authentication server 15, the user is subjected to the simple authentication by the second authentication server 17 and can use an application using the simple authentication.

As described in the first and second embodiments, the synchronization between the registered account information 27 of the second authentication server 17 and the registered account information 25 of the first authentication server 15 is not bidirectional. According to the present embodiment, even if the registered account information 27 of the second authentication server 17 and the registered account information 25 of the first authentication server 15 are bidirectionally synchronized, a user registered in the first authentication server 15 by the bidirectional synchronization can use the application using the simple authentication.

An advantage obtained by the present aspect is described below.

For example, in the first embodiment, a general user who logs in from the operation panel is subjected to the simple authentication. This makes it possible for the user to use a service using the simple authentication provided by the digital multifunctional apparatus 11. For example, the user can use a service for providing information similar to the status screen illustrated in FIG. 5.

It is assumed that, if a general user performs a web login, the user is registered by synchronization or manually in the first authentication server 15 with user authority.

In this case, the user logs in after being subjected to authentication by the first authentication server 15. As a result, the user is subjected to the LDAP authentication but not the simple authentication. The user cannot use a service for which login by simple authentication is required.

That is, the user cannot access the status screen illustrated in FIG. 5 or it is not assured that the user obtains correct information even if the user can access the status screen. Further, unless the user logs in using the simple authentication, the user also fails to access the application for providing the counter information of the digital multifunctional apparatus on the system 100. Even if the access by the user is successful, it is not assured that the user can obtain correct information.

However, according to the present aspect, even a general user registered in the first authentication server 15 as described above can be subjected to authentication by the second authentication server 17.

As described above, (i) the user authentication management device according to the present invention includes a login request receiver that receives a login request from a user from a plurality of inputters via a path corresponding to each of the plurality of inputters, an authentication scheme selector that selects any one of a plurality of authentication schemes and provides identification information of the user related to the received login request to the selected authentication scheme to perform user authentication, and a user information storage that stores a user authentication result received from the selected authentication scheme as user information related to the user, in which the authentication scheme selector selects an authentication scheme predetermined corresponding to a path through which the login request is received.

In the present invention, the path is a path through which login information is transmitted from the inputter to the login request receiver. In the above-described embodiment, the path is a path through which a login request input on the operation panel is transmitted to the login request receiver. Apart from that, there is a path through which a login request input by an external device connected via the network is transmitted to the login request receiver via the network.

The authentication scheme is a mechanism for managing in a unified manner user information in a system in which a plurality of devices are connected via a network. A specific aspect of the authentication scheme is, for example, an internal authentication unique to each device, and another aspect is an authentication scheme using the authentication server.

A specific example of the authentication scheme used for user authentication is an authentication scheme following the LDAP (Lightweight Directory Access Protocol). The LDAP is a typical authentication scheme, but there are various other authentication schemes, and the LDAP is only one of many authentication schemes.

The identification information is information for identifying a user related to the authentication, and generally includes a user ID and a password, but the identification information is not limited to this as long as the identification information is information that identifies the user.

A user authentication result is basically information on whether a user performing a login request is permitted to log in to the system, that is, whether the user is a registered user. Further, if the user is a registered user, the result may include information indicating an attribute of the user. The attribute of the user may include information related to the authority of the user.

The login request receiver and the authentication scheme selector are electronic circuits mainly including a CPU and a memory as hardware resources, and include an input and output interface circuit and the like. The identification and authentication processing operator in the embodiment described above contains the login request receiver and the authentication scheme selector according to the present invention.

Further, the user information storage is a non-volatile storage device that can be rewritten as a hardware resource. Specific aspects of the user information storage include, for example, a flash memory and a hard disk drive (HDD).

Further, preferable aspects of the present invention will be described.

(ii) The user authentication management device may further include a communicator that communicates with a plurality of external authentication servers, and the plurality of authentication schemes may include at least a first authentication scheme provided by a first external authentication server and a second authentication scheme provided by a second external authentication server.

With this configuration, the authentication scheme selector can select, depending on a path through which a login request is received, for example, the first authentication scheme provided by the first external authentication server for a login request received from the first path, and the second authentication scheme provided by the second external authentication server for a login request received from the second path.

(iii) The user authentication management device may further include an operation processor that receives an input from a user, and a communicator that communicates with an external information processing apparatus, and the path may include at least a path corresponding to a login request from the operation processor and a path corresponding to a login request from the external information processing apparatus.

With this configuration, the authentication scheme selector can select a different authentication scheme depending on whether the path through which the login request is received is the path corresponding to the login request from the operation processor or the path corresponding to the login request from the external information processing apparatus. For example, the authentication scheme selector can select the first authentication scheme provided by the first external authentication server if the login request is received via the first path from the operation processor, and the second authentication scheme provided by the second external authentication server if the login request is received via the second path from the external information processing apparatus.

(iv) Information related to the user authentication may include information related to an authority of the user.

With this configuration, it is possible to acquire information related to the authority imparted to a user who is logged in by the selected authentication scheme. Different user authorities may be acquired depending on the path through which the login request is received.

(v) In a case where a first authentication scheme is determined corresponding to a first path and a second authentication scheme is determined corresponding to a second path, if the authentication scheme selector receives user information indicating that the identification information related to a login request received via the first path is identification information of an unregistered user in the first authentication scheme, the authentication scheme selector may subsequently provide the identification information to the second authentication scheme to perform user authentication by the second authentication scheme.

With this configuration, a login by an unregistered user in the first authentication scheme selected according to the path through which the login request is received is not simply rejected by the first authentication scheme, but may transition to another authentication scheme to subject the user to user authentication. If the user can be authenticated by the authentication scheme after transition, the user can use a service and an application corresponding to the authentication scheme after transition.

(vi) In a case where a first authentication scheme is determined corresponding to a first path and a second authentication scheme is determined corresponding to a second path, if the authentication scheme selector receives user information indicating that the identification information related to a login request received via the first path is identification information of a user having a specific authority in the first authentication scheme, the authentication scheme selector may subsequently provide the identification information to the second authentication scheme to perform user authentication by the second authentication scheme.

With this configuration, for a user imparted with specific authority in the first authentication scheme selected according to the path through which the login request is received, it is possible to transition to the second authentication scheme different from the first authentication scheme to subject the user to user authentication. If the user can be authenticated by the authentication scheme after transition, the user can use a service and an application corresponding to the authentication scheme after transition. That is, a user imparted with specific authority in the first authentication scheme behaves similarly to a user subjected to user authentication by the second authentication scheme, and uniform behavior among different authentication schemes is possible.

(vii) Another aspect of the present invention may include an image processing apparatus including the user authentication management device.

(viii) Still another aspect of the present invention may include a user authentication management method including using a computer to execute receiving a login request from a user from a plurality of inputters via a path corresponding to each of the plurality of inputters, selecting any one of a plurality of authentication schemes and providing identification information of the user related to the received login request to the selected authentication scheme to perform user authentication, and receiving a user authentication result from the selected authentication scheme and storing the received result as user information related to the user, in which the selecting may include selecting an authentication scheme predetermined corresponding to a path through which the login request is received.

(ix) Yet another aspect of the present invention may include a non-transitory storage medium for storing a user authentication management program for causing a computer to execute a process for receiving a login request from a user from a plurality of inputters via a path corresponding to each of the plurality of inputters, an authentication scheme selection process for selecting any one of a plurality of authentication schemes and providing identification information of the user related to the received login request to the selected authentication scheme to perform user authentication, and a process for receiving a user authentication result from the selected authentication scheme and storing the received result as user information related to the user, in which the authentication scheme selection process may include selecting an authentication scheme predetermined corresponding to a path through which the login request is received.

Preferred aspects of the present invention include combinations of any aspects among the above-described plurality of aspects.

In addition to the above-described embodiments, various modifications of the present invention are possible. These modifications should not be interpreted as not belonging to the scope of the present invention. The present invention shall include a meaning equivalent to the claims and all modifications within the scope.

DESCRIPTION OF REFERENCE NUMERALS

11, 11a, 11b: Digital multifunctional apparatus,
13c, 13d, 13e: Administrator PC
15: First authentication server
17: Second authentication server
21A, 21B: General user
21C, 21D, 21E: Administrator
23a, 23b, 23c, 23d, 23e, 23g: Identification information
23f: Network access
25, 27: Registered account information
31: Input interface
33: Network interface
35: Operation panel processing operator
37: Device and web processing operator 39: Setting information storage memory
41: Identification and authentication processing operator
41a: Login request receiver
41b: Authentication scheme selector
43: User information storage memory
45: Logged-in user information memory
47: Authority information storage memory
51: Copy processing operator
53: Printer processing operator
55: Other-job processing operator
57: Network
59a: Internal path
59b: External path
61: Operation processor
63: Operation panel
65: IC card reader
71, 72: Login screen
73: Web login screen
74: Status screen
75: "System setting" tab
76: System setting screen
100: System

What is claimed is:

1. An image processing apparatus, comprising:
an operation processor that receives an input from a user;
a login request receiver that receives a user's login request via at least one of an external path that receives the user's login request from an external information processing apparatus and an internal path that receives the user's login request from the operation processor;
an authentication scheme selector that selects any one of a first authentication scheme and a second authentication scheme, the first authentication scheme being performed by a first external authentication server that provides a single sign-on function, the second authentication scheme being a simpler authentication scheme than the first authentication scheme and performed by a second external authentication server, and provides identification information of the user related to the received login request to the selected authentication scheme to perform user authentication; and
a user information storage that stores a user authentication result received from the selected authentication scheme as user information related to the user, wherein
the authentication scheme selector selects the first authentication scheme when the login request is received via the external path, and selects the second authentication scheme when the login request is received via the internal path,
the authentication scheme selector imparts an administrator authority to the user who logs in using the first authentication scheme and has been registered as an administrator in the first external authentication server, and
the authentication scheme selector imparts a general user authority to the user in a case where the user logs in using the second authentication scheme.

2. The image processing apparatus according to claim 1, wherein information related to the user authentication includes information related to an authority of the user.

3. The image processing apparatus according to claim 1, wherein in a case where a first authentication scheme is determined corresponding to a first path and a second authentication scheme is determined corresponding to a second path, if the authentication scheme selector receives user information indicating that the identification information related to a login request received through the first path is identification information of an unregistered user in the first authentication scheme, the authentication scheme selector provides the identification information to the second authentication scheme to perform user authentication by the second authentication scheme.

4. The image processing apparatus according to claim 2, wherein in a case where a first authentication scheme is determined corresponding to a first path and a second authentication scheme is determined corresponding to a second path, if the authentication scheme selector receives user information indicating that the identification information related to a login request received via the first path is identification information of a user having a specific authority in the first authentication scheme, the authentication scheme selector provides the identification information to the second authentication scheme to perform user authentication by the second authentication scheme.

5. A user authentication management method implemented in an image processing apparatus using a computer to execute:
receiving an input from a user by an operation processor of the image processing apparatus;
receiving a user's login request via at least one of an external path that receives the user's login request from an external information processing apparatus and an internal path that receives the user's login request from the operation processor of the image processing apparatus;
selecting any one of a first authentication scheme and a second authentication scheme, the first authentication scheme being performed by a first external authentication server that provides a single sign-on function, the second authentication scheme being a simpler authentication scheme than the first authentication scheme and performed by a second external authentication server, and providing identification information of the user related to the received login request to the selected authentication scheme to perform user authentication; and
receiving a user authentication result from the selected authentication scheme and storing the received result as user information related to the user, wherein
the selecting includes selecting the first authentication scheme when the login request is received via the external path, and selects the second authentication scheme when the login request is received via the internal path,
an administrator authority is imparted to the user who logs in using the first authentication scheme and has been registered as an administrator in the first external authentication server, and
a general user authority is imparted to the user in a case where the user logs in using the second authentication scheme.

6. A non-transitory storage medium for storing a user authentication management program implemented in an image processing apparatus, the user authentication management program causing a computer to execute:
a process for receiving an input from a user by an operation processor of the image processing apparatus;
a process for receiving a user's login request via at least one of an external path that receives the user's login request from an external information processing apparatus and an internal path that receives the user's login request from the operation processor of the image processing apparatus;

an authentication scheme selection process for selecting any one of a first authentication scheme and a second authentication scheme, the first authentication scheme being performed by a first external authentication server that provides a single sign-on function, the second authentication scheme being a simpler authentication scheme than the first authentication scheme and performed by a second external authentication server, and providing identification information of the user related to the received login request to the selected authentication scheme to perform user authentication; and a process for receiving a user authentication result from the selected authentication scheme and storing the received result as user information related to the user, wherein the authentication scheme selection process includes selecting the first authentication scheme when the login request is received via the external path, and selects the second authentication scheme when the login request is received via the internal path, an administrator authority is imparted to the user who logs in using the first authentication scheme and has been registered as an administrator in the first external authentication server, and a general user authority is imparted to the user in a case where the user logs in using the second authentication scheme.

7. The image processing apparatus according to claim 1, wherein the authentication scheme selector imparts the general user authority to the user who logs in using the first authentication scheme and has been registered as a general user in the first external authentication server.

8. The image processing apparatus according to claim 1, wherein the authentication scheme selector transmits an error in a case where the user is not registered in the first external authentication server.

* * * * *